Patented Aug. 8, 1933

1,921,180

UNITED STATES PATENT OFFICE 1,921,180

PROCESS FOR THE PURIFICATION OF COPPER

George S. Evans, Bronxville, N. Y., assignor to The Mathieson Alkali Works, Inc., New York, N. Y., a Corporation of Virginia No Drawing. Original application March 19, 1929, Serial No. 348,350. Divided and this application May 11, 1931. Serial No. 536,651

4 Claims. (Cl. 75—62)

This invention relates to improvements in the refining of copper in reverberatory furnaces in which copper is charged into the furnace and refined therein. The present application is a division of my prior application, Serial No. 348,350, filed March 19, 1929, which issued January 12, 1932 as United States Letters Patent No. 1,841,020.

In one application of the present invention, there is charged into the reverberatory furnace, along with the copper charge to be melted, a predetermined amount of densely aggregated soda ash or of a refining agent of which soda ash is the principal active constituent, and the melting operation is then carried out. The added soda ash melts before the copper charge melts and forms a low melting point slag or flux. The molten soda ash, or the slag formed from the soda ash and impurities admixed with the copper, forms a pool into and under which the molten copper flows as it is melted, thus giving a protective covering over the bath of molten copper from the beginning of the melt. The molten soda ash also has the added advantage and effect of extending the period of contact with the molten copper, since it is present and exerts its refining action during the melting operation, thus prolonging the period of refining by the soda ash slag without prolonging the duration of the whole operation of melting and refining.

The addition of soda ash to the cold charge before melting thus has various advantages, giving an improved refining of the copper during the melting operation, insuring that a thinly fluid slag will be produced, forming a protective layer over the molten copper, prolonging the period of refining without prolonging the entire operation of melting and refining, etc.

I have found that by adding a fluxing material of a low melting point, such as fused soda ash, with the cold copper stock, this fluxing material will form a pool of slag of low melting point in the bottom of the furnace which serves to protect the molten copper from oxidation and from absorption of impurities such as sulfur from the fuel. This pool of low melting point slag, which is formed before the melting of the copper begins, also performs other useful services. In the case of fused soda ash, this begins to react with impurities contained in the charge well ahead of the period of complete fusion of the copper charge, forming a fluid active slag which exerts a refining action on the copper as it melts and as the drops or streams of molten copper pass through the slag and remain in contact therewith, while the whole charge is being melted down. The refining action of the reagent is thus obtained during the melting operation and this refining action is thus prolonged without prolonging the normal cycle of operations. In fact, this refining action of the soda ash slag going on coincident with the melting operation has, in certain copper refining operations, materially reduced the total time of the refining cycle with a saving in fuel overhead, and increased output per furnace, etc. Furthermore, this addition of soda ash to the cold charge results in bringing up the slag in the early stages of the melting period, thereby increasing the thermal efficiency of the furnace in certain other operations. Moreover, by bringing up the slag, it is possible to effect an earlier and cleaner first skim which removes impurities contained in the copper charged and which permits improved heating of the skimmed copper surfaces. Further additions of soda ash can be made to improve the subsequent refining operation, particularly where the slag first formed is skimmed from the copper during the early period of operation.

Copper is commonly charged into reverberatory furnaces in the form of pigs or slabs and is there melted as a part of the copper refining process. When fused soda ash is charged with the cold copper, it is melted ahead of the copper and reduces absorption of impurities such as sulphur from the fuel and at the same time reduces arsenic and other impurities going in with the cold charge of copper, thus increasing the purity of the bath of molten copper produced. For example, it has been found that arsenic-bearing blister copper which, when melted down without the addition of sodium carbonate, showed an arsenic content of 0.06%, but when melted down with the addition of sodium carbonate added with the cold charge gave a product containing only 0.02% arsenic.

This reaction of sodium carbonate which effects arsenic reduction is promoted by the presence of oxygen in the molten copper, and by oxidizing conditions, such as the maintenance of a slightly oxidizing flame, or the addition of oxygen-bearing materials such as copper oxide, which may be added in the bottom of the furnace along with fused soda ash. In this instance the copper oxide is absorbed directly by the molten copper but other oxygen-bearing materials may be used.

The presence of oxygen in the copper bath also aids in the removal of iron as iron oxides and the removal of sulfur by oxidation to sulfur dioxide gas. When remelting pure cathode copper, a reducing agent such as carbon may be added with the soda ash to reduce the metal oxidized during the melting operation. When the reducing agent is properly proportioned with sufficient soda ash to absorb sulfur and other impurities from the fuel such addition will greatly reduce the refining cycle of operations. The refining action of the added soda ash is also accomplished during the melting operation, although it may continue after the copper is melted. It insures that the slag formed will be a thinly fluid slag and that impurities charged into the furnace with the copper which will combine with the soda ash will be so combined.

In certain operations, portions of the charge are added as cold stock, followed by additional copper charges added in the molten form. Here the soda ash may be added with the cold stock in the furnace followed by subsequent additions, added with the molten portion of the charge. In this operation, the soda ash (not necessarily densely aggregated) is added to the molten copper in the container wherein it is conveyed to the furnace, the soda ash fusing and flowing into the furnace with the molten copper. In some instances soda ash may be added only with the cold charge and in others only with the molten portion of the charge. Ordinarily the molten portion is added to the furnace shortly after the solid charge is thoroughly heated up or almost melting.

Where soda ash is added near the end of the refining operation, or where the slag present at the end of the melting or refining operation contains a considerable excess of sodium carbonate, or is thinly fluid and highly basic, such slag is sometimes advantageously re-used. It may be left in the furnace and employed to flux the first copper melted when a new charge is introduced into the furnace, or the soda ash refining slag may be skimmed off or otherwise removed from the furnace for re-use in the same or other furnaces where dense aggregated soda ash is required, thus giving a double advantage from the sodium carbonate added, its action being first during the completion of the refining and melting operation of the preceding charge and second during the initial stages of melting and refining of the following charge in the same furnace or other refining operations.

In some cases the final soda ash refining is carried out in a chamber outside of the furnace through which the molten copper passes after leaving the furnace and this last refining slag being of relatively high purity, is reclaimed for re-use in other refining operations.

In other operations the charge may be made up of molten copper entirely, and portions of it may be at different stages of refinement. The charge may be added to the furnace all at once or in successive additions. In such operation the soda ash may be added to the whole charge outside the furnace and thus conveyed to the furnace. Or, if the charge is added in several portions, the soda ash may be added wholly with the first portion or some may be added with each addition of copper.

In certain other operations the refining operation is carried out in stages. In applying the present invention to such processes the slag formed by the addition of soda ash to the copper before charging, or to the bath in the furnace itself, in a later stage, may be recovered in a fused form and used in an earlier stage.

By another method the molten copper flowing from the furnace is subjected to a series of refining operations by which the molten copper is first treated with a partially spent refining agent and then with increasing concentrations of refining agent and finally with the pure refining agent. The process may be so arranged that the refining material and the molten copper pass in counter-current to each other. The copper may pass through an elongated hearth through which the refining agent is passing in counter-current and in contact with the molten copper.

A refining action may also be carried out exteriorly to the furnace in a receptacle which may be unheated. Molten copper from the furnace is added to the receptacle and refined copper is withdrawn in such a way that a pool of molten copper is maintained in the receptacle. An alkaline slag is maintained in the receptacle by adding such amounts of a soda ash refining agent as may be required.

Although the various modifications of the present invention just described are described in connection with the use of soda ash only, it is to be understood and is intended that in any of these modifications copper oxide or other similar oxygen-bearing material may be added if deemed desirable.

The fluxing material is advantageously added in the form of fused soda ash briquettes, or pigs of about two pounds each, but may be added in melted form with a portion of liquid charge. Where the soda ash is to be added to a quiet pool of copper or a body of molten copper which is not being subjected to a hot blast, as in a ladle before or after the refining operation or in the furnace after the blast is removed, it may be added in the regular powdered form and the resultant fused slag will consist in large part of fused soda ash and can be recovered and used as a densely aggregated soda ash in the furnace. In some operations, when the charge is added cold, the soda ash may be added in the powdered form in a suitable container with the cold charge. The amount of soda ash added can be varied, depending upon the character of the copper charged, impurities contained in the copper, etc. Additional soda ash can be added subsequently, after the charge is melted, and particularly where the slag first melted is skimmed off. The molten soda ash exerts its refining action upon the copper as well as its protective action, both during the melting of the copper, and during the subsequent maintenance of the molten copper in the furnace prior to its use for casting or other purposes. It insures a thinly fluid slag, and a metal which can be more readily cast; and which gives castings of superior properties.

While I have referred to the soda ash as exerting the refining action, I do not desire to limit myself to the action of the sodium carbonate per se, since the action seems to be one in which the sodium carbonate is decomposed into sodium oxide and carbon dioxide, with the sodium oxide actively taking part in the refining operation. The refining agent is added, however, as sodium carbonate or soda ash, and preferably in the form of cakes of fused soda ash, although other refining mediums can also be employed, for example, mixtures of sodium carbonate and calcium carbonate or lime or limestone, or calcium fluoride, which, when added along with the cold copper charge in the reverberatory furnace, will form a thinly fluid slag, with advantages such as those hereinbefore referred to.

In my prior application, Serial No. 255,268, filed February 18, 1928, which issued May 20, 1930 as United States Patent No. 1,759,347, I have described and claimed the operation of air furnaces for melting iron and steel with addition of a soda ash refining agent to the metal bath. The present application relates, in part, more particularly to the addition of a soda ash refining agent to the furnace along with the cold copper charge and the carrying out of the melting operations so that the soda ash refining agent will be melted and will exert its protective and refining action during the melting operation. The process of this application can advantageously be carried out simultaneously with the process of said prior application, by continuing the action of the soda ash refining agent, for example, by adding further amounts of the soda ash refining agent during the subsequent operations, as described in said prior application.

I claim:

1. The method of refining copper which comprises charging the copper, a flux material containing a refining agent of which sodium carbonate is the chief active ingredient, and copper oxide into a reverberatory furnace and carrying out the melting and refining operation.

2. In the process of refining copper in a reverberatory furnace the step of adding with the solid metal charge, a refining agent containing sodium carbonate as its chief active ingredient and an oxygen-bearing material.

3. In the process of refining copper in a reverberatory furnace, the step of adding with the solid metal charge, a refining agent containing sodium carbonate as its chief active ingredient and copper oxide.

4. The method of refining copper in a reverberatory furnace to remove oxidizable impurities therefrom, which comprises supplying oxygen to the molten copper during the early portion of the refining treatment by the addition of an effective solid oxygen-bearing and oxidizing material and a flux material containing a refining agent of which sodium carbonate is the chief active ingredient.

GEORGE S. EVANS.